K. O. A. CARLSSON.
CREAM SEPARATOR.
APPLICATION FILED SEPT. 23, 1905.

937,986.

Patented Oct. 26, 1909.
2 SHEETS—SHEET 2.

Inventor
Knut O. A. Carlsson
By his Attorneys
Criswell & Criswell

Witnesses
A. Bickel

UNITED STATES PATENT OFFICE.

KNUT O. A. CARLSSON, OF NEWARK, NEW JERSEY.

CREAM-SEPARATOR.

937,986.  Specification of Letters Patent.  Patented Oct. 26, 1909.

Application filed September 23, 1908. Serial No. 454,374.

*To all whom it may concern:*

Be it known that I, KNUT O. A. CARLSSON, a citizen of the United States, and a resident of Newark, county of Essex, and State of New Jersey, have invented certain new and useful Improvements in Cream-Separators, of which the following is a full, clear, and exact description.

This invention relates more particularly to a centrifugal separator adapted to separate the cream from milk.

The primary object of the invention is to provide a simple and efficient separator in which the milk or other liquid from which the constituent parts are to be separated from each other may be passed or forced through the separator under pressure or by gravity in such a way as to compel the same to take a zigzag course through the separator while a part thereof is rotated, and at the same time provide effective means for collecting the cream and separating it from the milk so that they will not again commingle or become mixed, thus effecting a complete separation of the cream and overcoming many of the objections incident to separators as ordinarily constructed.

A further object of the invention is to provide a separator which may be easily constructed and assembled, and which has great capacity for separating cream from the milk with a minimum amount of space required therefor.

With these and other objects in view, the invention will be hereinafter more particularly described with reference to the accompanying drawings, which form a part of this specification, and will then be pointed out in the claims at the end of the description.

Figure 1:
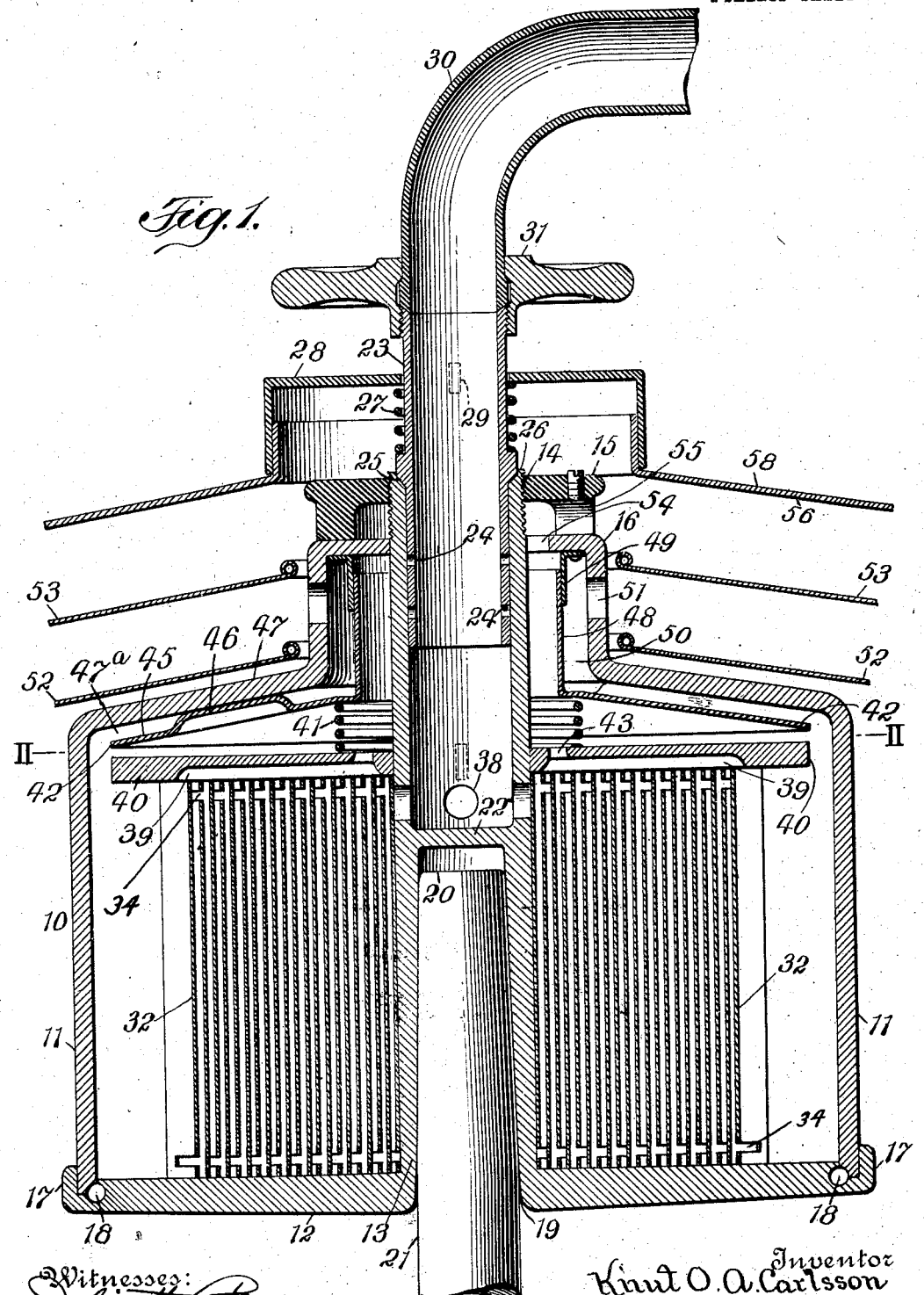
Figure 2:
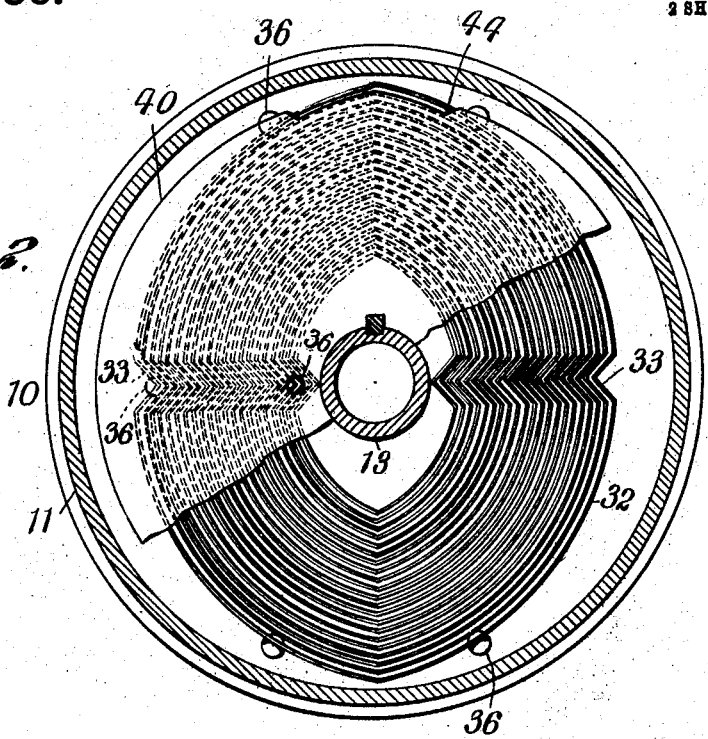
Figure 3:
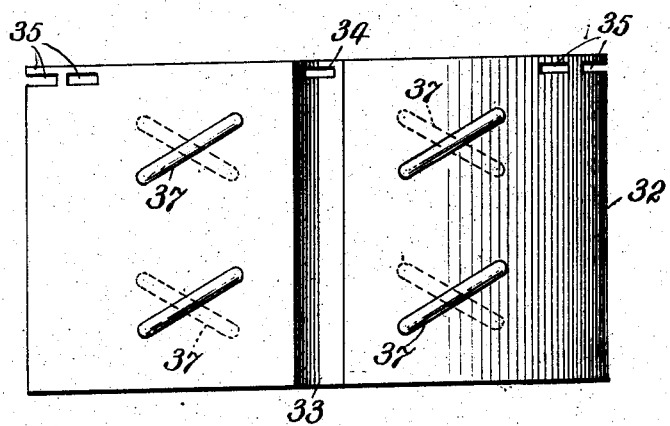

In the drawings, Figure 1 is a vertical section taken centrally on the short axis of the division members of one form of separator embodying my invention. Fig. 2 is a sectional plan view, taken on a line II—II of Fig. 1; and Fig. 3 is a detail view of one of the division members.

While I shall describe the invention as more particularly adapted for separating cream from milk, it will be understood that the invention is equally applicable for the separation of other compound liquids into their constituent elements.

The casing 10 may be of any suitable construction, and may comprise a body part or member 11 which is substantially cup-shaped in form, and a base member 12, and from the base member 12 may project a sleeve or tubular part 13, the upper end of which is screw-threaded at 14 which is adapted to be engaged by a nut 15. The nut 15 has its lower edge abutting against the surface or upper part 16 of the casing member 11, and serves to force the said members 11 and 12 into close engagement with each other, the said member 12 being provided with a marginal flange 17 adapted to engage the outer lower surface of the body 11, and may be provided with a groove 18 for packing or other means to provide a tight joint between the two members. The sleeve or tubular part 13 of the member or base 12 has a tapered opening 19 in which is adapted to fit the tapered end 20 of a shaft 21 which may be connected with any suitable driving means, whereby the said separator casing may be rotated at a high speed, and above the end 20 of the shaft 21, is a partition 22, above which is a pipe or connection 23 which serves as a source of supply for the milk or other liquid. The connection 23 fits into the upper open end of the sleeve or part 13, and is normally held stationary, and where it fits within the open end of the part 13 may be provided with a plurality of openings 24 for the milk or liquid to pass therethrough so as to serve as a means for lubricating the bearing surface between the part 13 and the connection 23. This connection 23 is provided with a beveled part 25 serving as a valve which engages the beveled end or seat 26 in the upper end of the part 13, and said connection 23 is normally forced downward by means of a spring 27 arranged around the connection 23 and interposed between a shoulder on said connection and the under surface of a fixed cap or cover 28, the said connection being held to the cover by means of a key 29 or in any other desired way. A pipe 30 leading to the source of supply is held to the upper end of the connection 23 by means of a coupling 31, a part of which is threaded and engages the threaded end of the connection 23 and made to force the end of the pipe 30 into engagement with the outer end of the connection 23 to provide a tight joint therewith.

To cause the milk to take a zigzag course and to properly separate the cream from the milk, I provide within the casing a plurality of division members 32. These division members may be of any desired number and may be substantially oval or elliptical or any other desired form, and concentrically arranged with respect to the other. I prefer to use a number of the division members, and each of said division members at the shortest axis or diameter thereof is provided with an inwardly-extending and substantially V-shaped part or depressed portion 33, and in these depressed portions are slots or openings 34. The openings or slots 34 of each division member alternate with respect to members adjacent thereto. That is the slots or openings of one member are near the top thereof, while the slots in the next member are at the bottom so that the liquid must take a zigzag course through the spaces formed by the several division members and pass alternately upward and downward between said members, and by reason of the fact that the openings 34 are nearest the center, the cream will collect at these points, while the skimmed or blue milk will pass through the openings 35 arranged at the points of the greater axis or diameter of said members. These slots or openings 35 are also alternately arranged so as to cause the milk or liquid to take a zigzag course through the separator, and in one division member said openings are located at the top, while in the next division member they are located at the bottom. The division members or any of them are held to the base member 12 by means of pins or projections 36, Fig. 2, and said members are provided with ribs or depressed parts 37 extending diagonally along the outer surface thereof at intervals apart, and said ribs or projecting parts serve to hold the different sections or division members the proper distance apart, and further to keep the milk evenly distributed over the surface of said members.

The sleeve or part 13 of the casing is provided with one or more openings 38, for the milk from the source of supply to pass within the casing to the space between the innermost division member and said part 13, and as the casing is rotated, the liquid while being forced under pressure through the spaces between the division members, or by gravity if desired, will cause the liquid to pass in a zigzag way between the several division members, the blue or skimmed milk by reason of its gravity will pass through the openings 35, in the members, while the cream will collect at the parts 33, and will pass through the openings 34 into the channels or grooves 39 formed in the under surface of a cap or cover 40. Said grooves 39 are two narrow groove-shaped channels radially and oppositely disposed in the under-surface of said cap 40. This cap or cover is normally forced downward against the upper edges of the division members by means of a spring 41 arranged around the part 13, and interposed between the cover or deflector 42, and said cap piece or cover 40. The cream thus passes through the cover 40 through the channels 39 and openings 43 under the cap 42, while the skimmed milk in passing through the openings 35 will pass out of the space between the outer division member and said cover 40, the latter being cut away, at 44, at its greatest diameter for this purpose.

The cover or deflector 42 has its body 45 provided with a plurality of depressed parts or protuberances 46 which hold the said body portion a suitable distance away from the under surface of the top 47 of the casing member 11, to provide a space 47$^a$ for the skimmed milk to pass between the body portion and the top 47 after the milk passes through the openings 35 of the outer division member. This deflector or device 42 is provided with an upwardly-projecting tubular part 48 which is adapted to fit within a ring or tubular device 49 secured within the upper portion of the casing member 11. The said tubular part 48 and member 49 into which the former fits provides an annular space 50 around the same forming a continuation of the space 47$^a$, and which communicates with one or more openings 51 in the casing member whereby the milk may pass through the space 47 into the space or chamber 50, and out of the openings 51 between the hoods or deflectors 52 and 53 which form a space around the casing at the upper portion thereof.

The cream after passing through the openings 43 of the cover 40, will pass upward within the tubular part 48 of the deflector or device 42, and out through one or more openings 54 to and through the opening 55 of the cap or nut 15, and in the space between the hood or deflector 53 and part 56 of the cover 58, both the cream and the milk being deposited in suitable receptacles provided therefor if desired.

It will thus be seen that the milk or other liquid to be separated into its constituent parts may be passed either by gravity or under a more or less high pressure from the source of supply to the tubular part 30 through the tubular part 13 of the casing, and by reason of the partition 22 will be deflected through the openings 38 into the space between the inner division members, and will pass in a zigzag way through the spaces between the several division members, the cream collecting toward the center and at the parts 33, so as to pass through the openings 34, and through the opening 43 upward and outward through the openings 54 and 55, while the blue milk or other part of the liquid will pass through the openings 35 in a zigzag way through the spaces between the several division members and out through the openings 44, Fig. 2, through the space 47ª, chamber 50, opening 51, between the hoods or devices 52 and 53, thus preventing the cream and milk after once being separated from again commingling.

Where the word "elliptical" or "oval" is used in connection with the form of the division members, it is to be understood that the terms are used in their broadest sense to include members which are longer one way than another, though the insertion is not limited to this particular form of division member.

From the foregoing it will be seen that a simple and efficient separator is provided for milk and other liquids in which the liquid may be forced through the separator under pressure, or may be made to pass therethrough by gravity and the movement of the machine itself; that by providing the division members as shown, the liquid will be thoroughly separated into its constituent elements and in case of milk substantially every particle of the cream will be separated therefrom; that by this means the separator may be made very compact and of a much less size than is required for the same capacity of separator by the ordinary method of separating the cream from the milk, and that the parts are so constructed that they may be readily made and easily assembled.

Having thus described my invention, I claim as new and desire to secure by Letters Patent:—

1. In a separator, the combination with a rotary casing, of a plurality of substantially elliptical division members separated from each other to provide a space and having openings therein which alternate and cause the liquid to take a zigzag course.

2. In a separator, the combination with a rotary casing, of a plurality of substantially elliptical division members separated from each other to provide a space and having openings therethrough at their greater and less diameters which alternate and cause the liquid to take a zigzag course.

3. In a separator, the combination with a rotary casing, of means for supplying liquid thereto, of a plurality of substantially elliptical division members spaced apart, each division member being provided with an inwardly extending depressed portion.

4. In a separator, the combination with a rotary casing, of means for supplying liquid thereto, of a plurality of substantially elliptical division members spaced apart, each division member being provided with an inwardly extending depressed portion, and having openings at their greater and less diameters which alternate and cause the liquid to take a zigzag course.

5. In a separator, the combination with a casing, of means for supplying the liquid thereto, and a plurality of vertically disposed elliptical division members spaced apart and concentrically arranged within said casing.

6. In a separator, the combination with a rotary casing, of means for supplying the liquid thereto, and a plurality of vertically disposed elliptical division members spaced apart, and each division member being provided with an inward extending depressed portion at its smallest diameter.

7. In a separator, the combination with a rotary casing having a base and a cap member, of means for rotating the casing, means for supplying liquid to said casing, a plurality of substantially elliptical-shaped division members spaced apart and having openings at their major and minor axes, each of said division members being provided with a depressed part at the minor axis thereof, said division members having openings at their major and minor axes for the passage of the milk and cream respectively, and said openings for both elements of the liquid alternating so that the liquid will have to pass upward and downward between the division members, and means for causing the milk and cream to pass independently from the casing.

8. In a separator, the combination with a rotary casing having a base and cap member, means for rotating the casing, means for supplying liquid to said casing, a plurality of elliptical division members spaced apart, and having openings at their major and minor axes for the passage of the milk and cream respectively, and said openings for both elements of the liquid alternating so that the liquid will have to pass alternately upward and downward between the division members.

9. In a separator, the combination with a casing, of a plurality of elliptical division members concentrically arranged within the casing and having diagonally arranged protuberances for holding the division members apart and for distributing the liquid over the surface thereof, each of said division members being provided with a substantially V-shaped depressed part extending lengthwise thereof.

10. In a separator, the combination with a casing, of a plurality of elliptical division members concentrically arranged within the casing and having protuberances for holding the division members apart and for distributing the liquid over the surface thereof.

11. In a separator, the combination with a casing, of a plurality of elliptical division members concentrically arranged within the casing and having protuberances for holding the division members apart, each of said division members being provided with two substantially V-shaped depressed parts extending lengthwise thereof.

This specification signed and witnessed this nineteenth day of September A. D. 1908.

KNUT O. A. CARLSSON.

Witnesses:
J. ALGOT CARLSSON,
MARIA CARLSSON.